(12) United States Patent
Fang (10) Patent No.: US 7,859,727 B2
(45) Date of Patent: Dec. 28, 2010

(54) IMAGE-GATHERING APPARATUS AND METHOD

(76) Inventor: Po-Hua Fang, 3F, No. 55, Aly. 16, Ln. 2, Kuang Fu St., YungHo City, Taipei (TW)

( * ) Notice: Subject to any disclaimer, the term of this patent is extended or adjusted under 35 U.S.C. 154(b) by 1623 days.

(21) Appl. No.: 10/256,425

(22) Filed: Sep. 27, 2002

(65) Prior Publication Data
US 2004/0004669 A1     Jan. 8, 2004

(30) Foreign Application Priority Data
Jul. 5, 2002 (TW) .............................. 91114900 A (51) Int. Cl.
*H04N 1/04* (2006.01)
(52) U.S. Cl. .................. 358/475; 358/497; 358/483; 358/474; 358/450; 358/453
(58) Field of Classification Search ................ 358/475, 358/509, 471–474, 497, 483, 482, 494, 512–514, 358/505, 506, 487, 484, 451, 450, 498; 382/312, 382/313, 318, 319, 299, 298; 250/208.1, 250/216, 239, 234–236; 355/67, 68; 399/211, 399/212; 359/851, 853, 850, 864
See application file for complete search history.

(56) References Cited

U.S. PATENT DOCUMENTS

| | | | | |
|---|---|---|---|---|
| 5,488,490 A | * | 1/1996 | Sawada et al. | 358/487 |
| 5,519,513 A | * | 5/1996 | Copenhaver et al. | 358/475 |
| 5,617,131 A | * | 4/1997 | Murano et al. | 347/233 |
| 5,764,816 A | * | 6/1998 | Kohno et al. | 382/299 |
| 5,793,514 A | | 8/1998 | Taylor et al. | |
| 6,917,453 B1 | * | 7/2005 | Onishi et al. | 358/483 |
| 2004/0057097 A1 | * | 3/2004 | Huang et al. | 359/212 |
| 2005/0002317 A1 | * | 1/2005 | Hakamata | 369/121 |

FOREIGN PATENT DOCUMENTS

JP     2001-153684 A     6/2001

* cited by examiner

*Primary Examiner*—Cheukfan Lee
(74) *Attorney, Agent, or Firm*—Stolowitz Ford Cowger LLP (57) ABSTRACT

The invention is to provide a light-focusing for image-gathering device that receive the light coming from the image of an object being scanned. The light-focusing for image-gathering device is comprised of: at least one reflection mirror, an imaging device and at least one raster (optical grate). The reflection mirror has plural concave surfaces that are arranged appropriately, and the concave surface provides the light being focused and reflected to a predetermined route. The imaging device receives the light reflected from at least one reflection mirror and converts it into electronic signal. The raster has plural pervious holes, of which positions are just respectively corresponded to each concave surface. The raster is located in the light-path route between the imaging device and at least one reflection mirror. When an image data of an object being scanned that can be divided into receivable image-and-light signal of the object being scanned and un-receivable image-and-light signal of the object being scanned is gathered executively, the un-receivable image-and-light signals of the object being scanned are first removed, then the adjacent receivable image-and-light signal of the object being be scanned is connected together to obtain a complete image output data.

32 Claims, 11 Drawing Sheets

IMAGE-GATHERING APPARATUS AND METHOD

This application claims the benefit of priority to Taiwanese patent application 91114900, filed on Jul. 5, 2002.

FIELD OF THE INVENTION

The invention relates to a light-focusing for image-gathering device and method, especially to a light-focusing for image-gathering device that has a reflection mirror comprised of plural concave surfaces arranged appropriately and a raster cooperated with plural pervious holes to filter unnecessary light, and to a method that proceeds light-focusing for image-gathering treatment to the scanned image of this kind of light-focusing for image-gathering device.

BACKGROUND OF THE INVENTION

Figure 1:
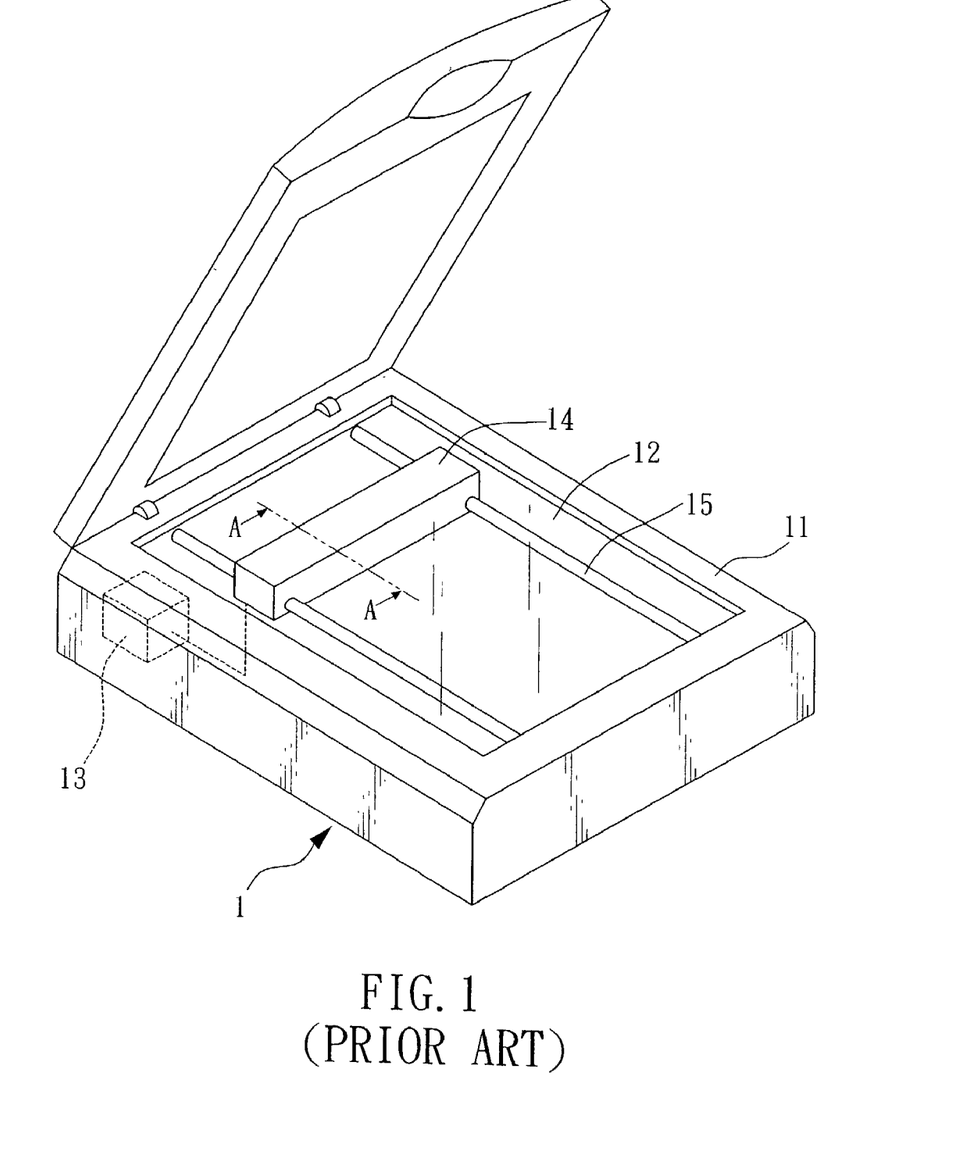
FIG. 1 is an illustration for the optical scanner according to the prior arts.

Please refer to FIG. 1, which is an embodiment of a flatbed-typed optical scanner typically seen in current market. Its main structure is that a document window glass 12 is arranged on the upper side surface of the outer casing 11 of an optical scanner 1 for supporting (placing) a manuscript to be scanned (not shown in the figure) and, bringing along an optical chassis 14 by a driving device 13 in the hollow outer casing 11 along a guiding rod 15 to proceed a linear motion, an image scanning job executed to the manuscript placed on the document window glass 12 is operated.

Figure 2:
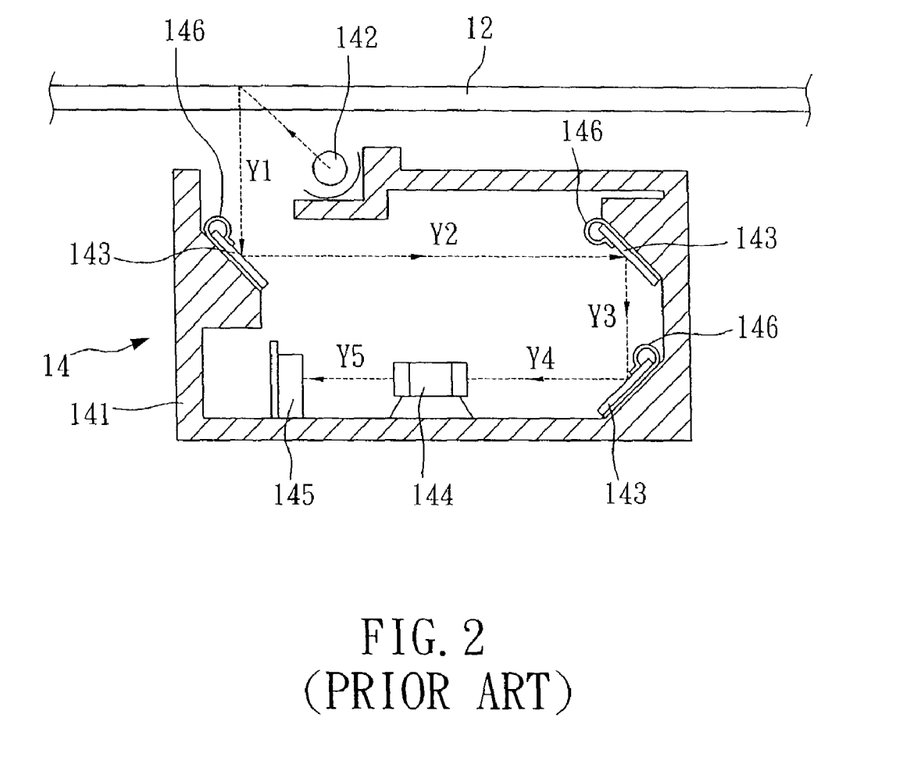
FIG. 2 is an illustration for the light-guiding device inside the optical chassis of the optical scanner according to the prior arts.

Please refer to FIG. 2, which is an A-A cross-sectional view for illustrating the optical chassis 14 of the optical scanner 1 according to the prior arts. The optical chassis 14 includes: a hollow outer casing 141, a light source 142 located at one appropriate position of the upper side surface of the outer casing 141, a light-guiding device comprised of plural reflection mirrors 143, a lens set 144, and a charge-coupled device 145 (CCD). The light, emitted from the light source 142, is incident onto the manuscript (not shown) placed on the document window glass 12, then the reflected light enters the casing 141 of the optical chassis 14 and is further reflected and direction-changed to increase its optical length to an appropriate length through the application of plural reflection mirrors 143 of the light-guiding device and, finally, the reflected light is focused by the lens set 144 and imaged on the charge-coupled device 145, by which the scanned image data is converted into electronic signal, wherein the total track (abbreviated as TT value) needed to focus the reflected light into a clear image is the summation of the lengths shown in FIG. 2: Y1+Y2+Y3+ . . . +Y5.

In the prior optical chassis 14 as shown in FIG. 1 and FIG. 2, since the lens set 144 is comprised of the elements such as convex lens etc. so, not only are the structure and the assembly of the lens set 144 all complicated and is the production cost higher, but also will the lens set 144 generate the effect of color-light separation to influence the scanning quality. Furthermore, since the reflection mirror 143 is comprised of a thin-plate-shaped glass, of which back is coated with silver, so the light will be reflected many times by plural glass mirrors during the reflection and the direction-changing procedure and, in such way, the effect of color-light separation will be strengthened. Besides, the reflection mirror 143 made of glass material is needed to be fixed at the predetermined position inside the casing 141 by additional spring piece 146, fixture mechanism, or other manners such as screw fixation so, not only are the assembly and the position more tedious, but also will the production cost be caused to increase substantially.

SUMMARY OF THE INVENTION

The main objective of the invention is to provide a light-focusing for image-gathering device and method, which may skip the traditional way of using lens set for light focusing and image gathering, instead at least one reflection mirror having plural concave surfaces is matched with a raster having plural corresponding pervious holes to proceed light gathering and form an image on the imaging device, such that the production cost is lowered and the effect of color-light separation is reduced.

The secondary objective of the invention is to provide a light-focusing for image-gathering device and method, which may adopt plural concave surfaces to process the light's gathering, assembling, and imaging. Furthermore, a method for light-focusing for image-gathering treatment is matched to gather and assemble the scanned image into a complete image output data.

A further objective of the invention is to provide a light-focusing for image-gathering device, of which the reflection mirror is structured as plural concaved surfaces, which are made of film-coating layers located on the light-reflecting surfaces, such that it can avoid the effect of color-light separation caused by the glass refraction.

To achieve above objectives, the invention provides a light-focusing for image-gathering device, which may receive the light reflected from an object being scanned, and which includes: at least one reflection mirror, an imaging device, and at least one raster.

The reflection mirror has plural concave surfaces that are arranged appropriately, and the concave surfaces may provide the light being gathered and direction-changed to a predetermined route.

The imaging device may receive the reflected light coming from at least one reflection mirror and convert it into electronic signal.

The raster has plural pervious holes, of which positions are just respectively corresponded to each plural concave surfaces, and the raster is located at the light-path route between the imaging device and the at least one reflection mirror to provide a function to filter unnecessary light.

To achieve above objectives, the invention applies the above light-focusing for image-gathering device to provide a light-focusing for image-gathering treatment method, which includes the following:

(a): Executively gather an image data of an object being scanned, of which image data is divided into two categories: one is plural developed-image-pixel signals of the image-light signal of the object being scanned that has already been received, and the other one is the plural hidden-image-pixel signals of the image-light signal of the object being scanned that are unable to be received, and each hidden-image-pixel signal is located between two developed-image-pixel signals.

(b): Remove the hidden-image-pixel signal.

(c): Connect each adjacent developed-image-pixel signal.

(d): Obtain a complete image output data.

For your esteemed members of reviewing committee to further understand and recognize the objectives, the characteristics, and the functions of the invention, a detailed description in matching with corresponding drawings is presented as the following.

DETAILED DESCRIPTION OF THE INVENTION

The main characteristic of the light-focusing for image-gathering device according to the invention is that the traditional means of a lens set used in an optical scanner for light-gathering and imaging operation is given up, while at least one reflection mirror having plural concave surfaces is applied to focus the light into an image formed on an imaging device. Furthermore, a raster having plural pervious holes correspondingly is applied to remove unnecessary light to obtain a preferable image quality. Additionally, in order to avoid the interrupted and discontinuous phenomenon of the scanned image because of the usage of the plural concave reflection mirrors, the invention also provides a light-focusing for image-gathering treatment method for proceeding the adjustment and correction for the scanned image. Since the invention does not need any lens set, so it has the advantages of lower cost and the uneasy generation of color-light separation phenomenon.

The detailed means, the action manners, and the achievable functions of the light-focusing for image-gathering device and the treatment method according to the invention and other technical characteristics are described in the following preferable embodiments.

In order to clearly describe the technical characteristics and the implementing manners of the invention, several embodiments and patterns of the raster and the reflection part of the invention are first introduced as the following.

Figures 3A, 3B:
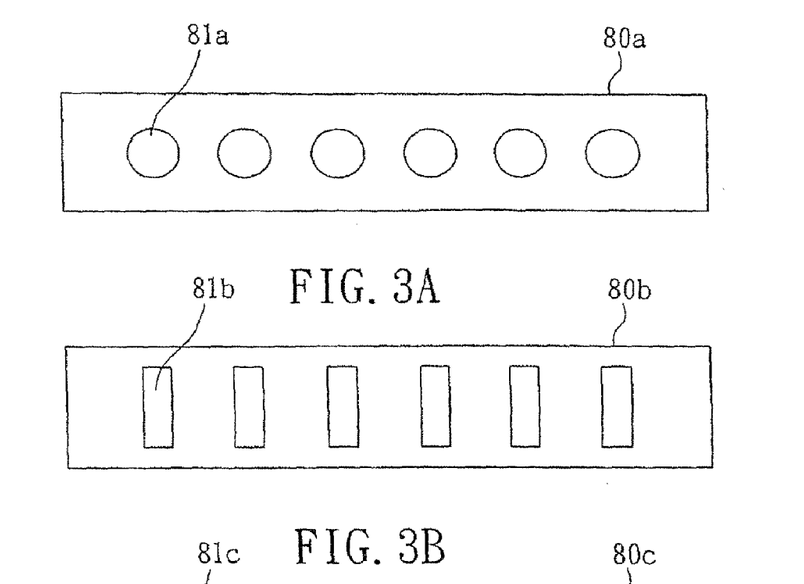
FIG. 3A is a structural illustration for the first preferable embodiment of the raster according to the invention.
FIG. 3B is a structural illustration for the second preferable embodiment of the raster according to the invention.
Figure 3C:
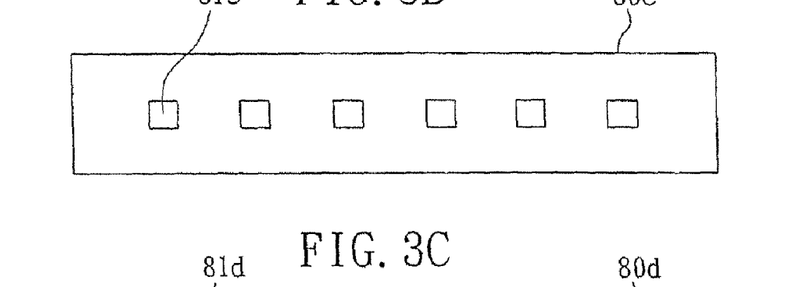
FIG. 3C is a structural illustration for the third preferable embodiment of the raster according to the invention.
Figure 3D:
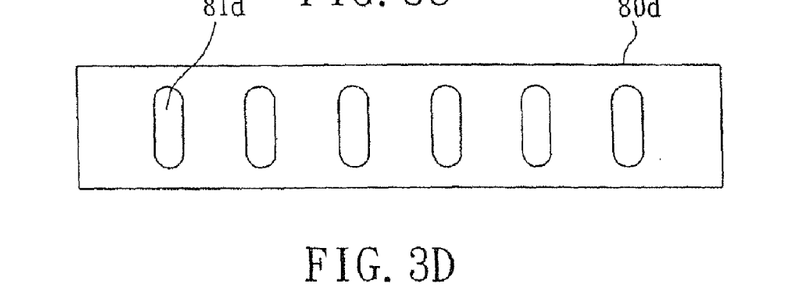
FIG. 3D is a structural illustration for the fourth preferable embodiment of the raster according to the invention.

Please refer to FIG. 3A to FIG. 3D, which are four different preferable embodiments for illustrating the structure of the raster of the invention. In the present preferable embodiments according to the invention, the raster has plural pervious holes 81 and, in FIG. 3A, the raster 81 is formed as a circular pervious hole 81*a*, of which the radius is preferably and commonly between 2 to 6 mm. Except the pervious hole 81*a*, other part of the raster 80*a* is constituted of opaque materials. The reason for restricting the size of the pervious hole 81*a* in here is mainly that, if the radius size of the pervious hole 81*a* is too large, then it is impossible to provide an excellent function to remove the unnecessary light but, if the radius size of the pervious hole 81*a* is too small, then it is easy to generate a phenomenon of light diffraction, so the size of the pervious hole 81*a* of the raster 80*a* must be restricted to a specific range, such that a preferable quality of scanning image may be obtained. In FIG. 3B, the pervious hole 81*a* is shown as long narrow stripe extending horizontally. The width (narrower side) of the pervious hole 81*b* shaped as a long narrow stripe is commonly between 2 to 6 mm. In FIG. 3C, the pervious hole 81*c* is formed as a square shape, of which each side is also preferably between 2 to 6 mm. In FIG. 3D, the pervious hole 81*d* is shown as an elliptical shape extending horizontally, and the width of each elliptical pervious hole 81*d* is commonly and preferably between 2 to 6 mm. Those who are familiar with such arts according to above description may execute such kind of shape variation, so it still possesses the merits of the invention and is also within the spirit and the range of the invention, and a detailed description is skipped herein.

Figure 4A:
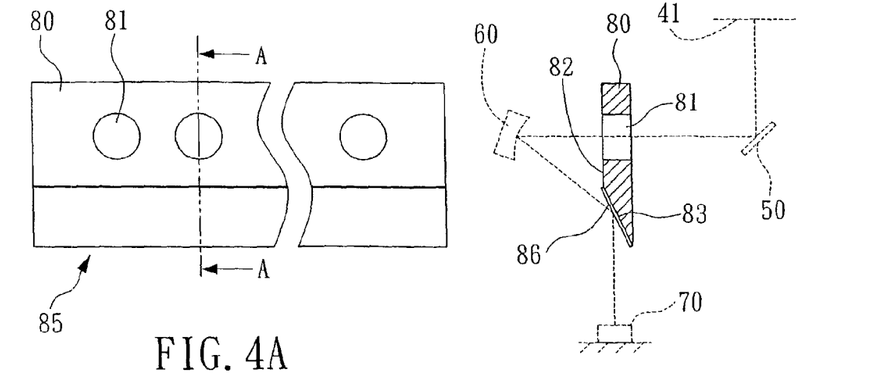
FIG. 4A is a front view and an A-A cross-sectional structural illustration for the first preferable embodiment of the reflection part of the invention.
Figure 4B:
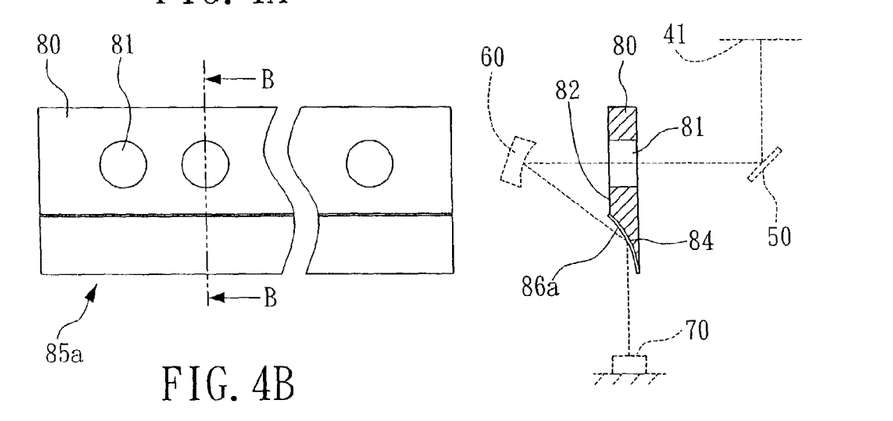
FIG. 4B is a front view and a B-B cross-sectional structural illustration for the second preferable embodiment of the reflection part of the invention.
Figure 4C:
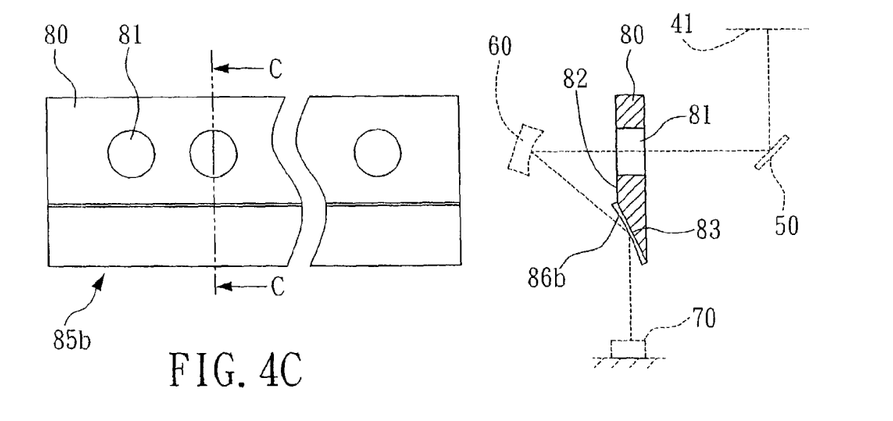
FIG. 4C is a front view and a C-C cross-sectional structural illustration for the third preferable embodiment of the reflection part of the invention.

Please refer to FIG. 4A to FIG. 4C, which are the front views and the cross-sectional illustrations for the structures of three different embodiments of the reflection part according to the invention. In the present preferable embodiments according to the invention, besides there are plural pervious holes 81 of various shapes according to the above embodiments, one side surface 82 of the raster 80 is further arranged with a reflection part 85, which may be provided to reflect a light to an imaging device 70. In FIG. 4A, an inclining surface 83 is notched on the side surface 82 to provide a connection to the reflection part 85, which may be a coating film layer, made of light-reflecting materials, arranged directly on the inclining surface 83 to be provided as a function of light-reflecting surface, wherein the light-reflecting materials of the coating film layer may be silver, chromium, aluminum, platinum, or other materials of excellent light reflection, all which may be formed on the inclining surface 83 by evaporating sputtering, sputtering, chemical deposition, or other film coating processes, and the thickness of the coating film layer may be single layer or multiple layers. Of course, the reflection part 85 may also be designed as a plane mirror or a flexible structure of thin plate made of non-glass materials with a coating film layer made of light-reflecting materials arranged directly on a reflection surface 86. Furthermore, the plane mirror or the thin plate structure may be secured on the inclining surface 83 by the pasting manner or the application of fixture, and the materials of the thin plate may be one kind of the following: paper, plastic, resin, macromolecule polymer, glass fiber, rubber, metallic thin piece, and other flexible materials of non-glass. One more thing is worth mentioning: the so-called flexible material is not referred to extremely soft material, but a material comprising an appropriate hardness that may keep the thin plate itself maintain a suitable planarity to achieve an excellent effect of light reflection. In FIG. 4B, an inclining concave surface 84 is arranged on the side surface 82 of the raster 80, such that a connection to the reflection part 85a is achieved. A coating film layer of light-reflecting material is arranged directly on the inclining concave surface 84 to constitute the reflection part 85a, which may also be formed by combining a concave surface mirror of same curvature to the inclining surface 84. Of course, by providing a thin plate structure made of flexible and non-glass material, a coating film layer, made of light-reflecting material, to be directly arranged on a reflection surface 86a is designed. When the thin plate structure is applied an external force, it still may be bent to a certain degree, but without being broken. The flexible materials may be relatively easy to be processed to different forms, and their adaptable ranges are quite extensive. On the contrary, the prior reflection mirror made of glass is very hard and brittle and, not only is it uneasy to be processed, but also is it impossible to be bent into curved surface, such That its application range is quite limited. In FIG. 4C, there is a inclining surface 83 notched on the side surface 82 of the raster 80, and the inclining surface 83 is a flat plane, but one reflection surface 86b of the reflection part 85b is designed as a concave-arced surface. Of course, such kind of design may also fulfill the above function to reflect and focus the light onto the imaging device 70.

Figure 5A:
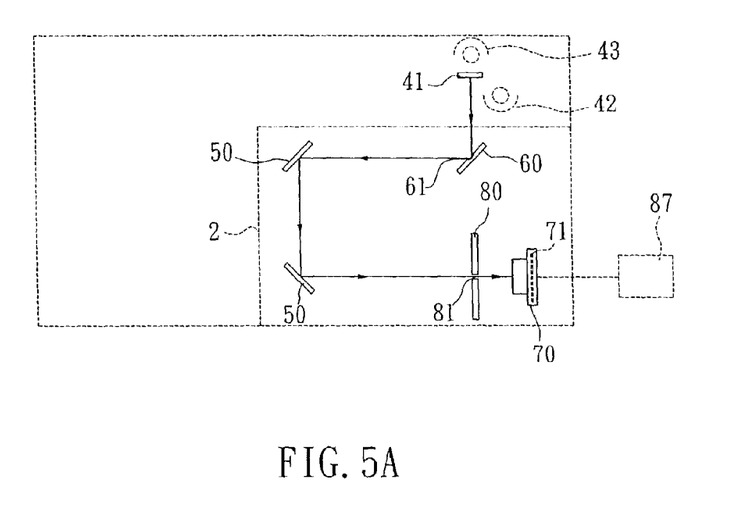
FIG. 5A is a preferable embodiment for illustrating the light-path route of the light-focusing for image-gathering device according to the invention.
Figure 5B:
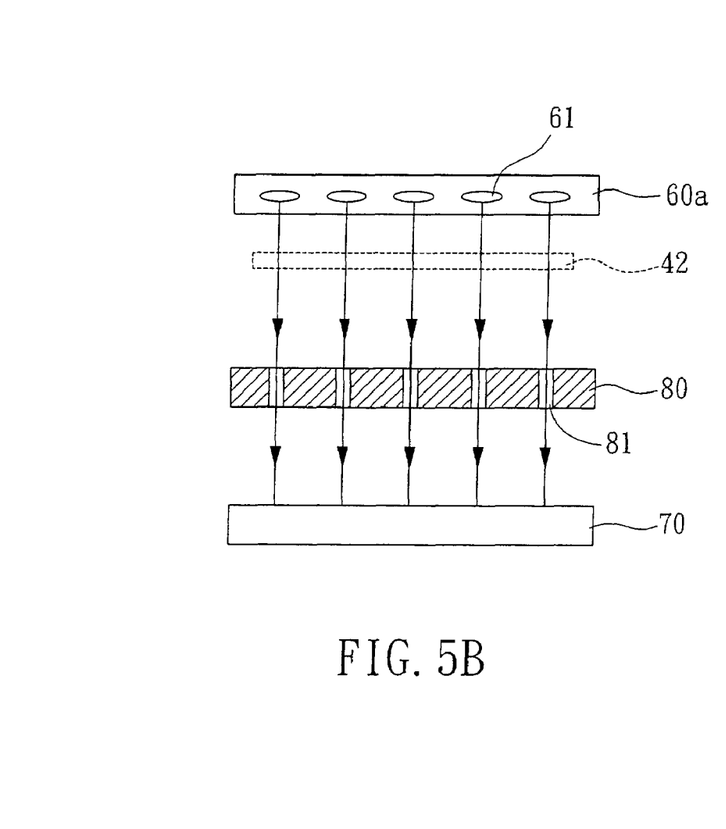
FIG. 5B is a first preferable embodiment for illustrating the light-focusing for image-gathering device according to the invention.
Figure 5C:
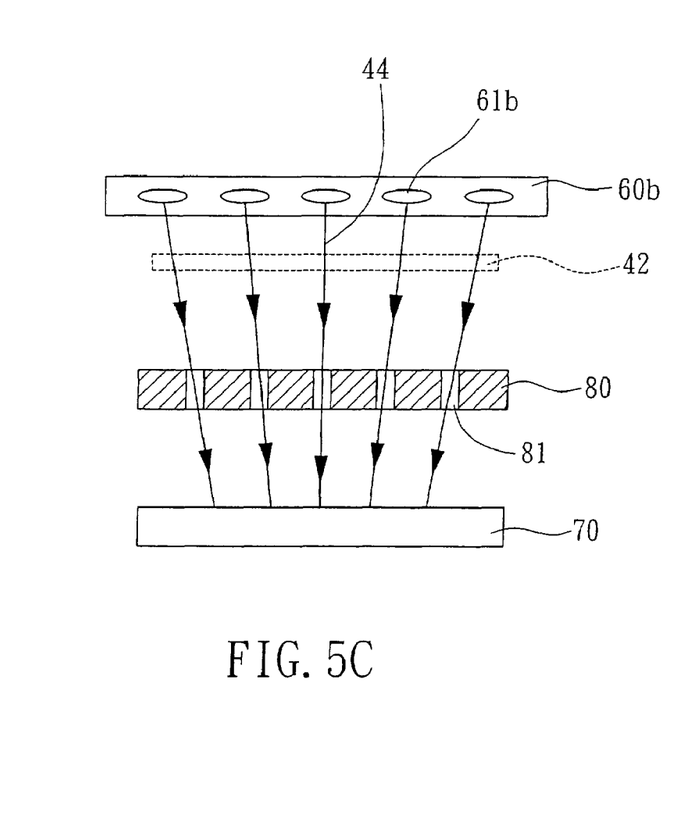
FIG. 5C is a second preferable embodiment for illustrating the light-focusing for image-gathering device according to the invention.

Please refer to FIG. 5A to FIG. 5C, which are respectively two different applications for the preferable embodiments for illustrating the light-focusing for image-gathering device according to the invention. In the present embodiments according to the invention, as shown in FIG. 5A, the light-focusing for image-gathering device 2 may receive the light of the image coming from an object 41 being scanned. The light-focusing for image-gathering device 2 is comprised of at least one reflection mirror 60, an imaging device 70, at least one raster 80, and at least one plane mirror 50. When it is desired to make a scanning mode to the reflective manuscript of an object 41 being scanned, a light emitted from a first light source 42 is incident upon the object 41 being scanned, then the reflected light coming from the object being scanned enters the light-focusing for image-gathering device 2 and, after several times of reflection and direction-change proceeded by at least one reflection mirror 60 and at least one plane mirror 50, the reflected light is passed through a raster 80 to remove the unnecessary light and is formed an image on the imaging device 70. When it is desired to proceed a scanning mode of transparent document, the light emitted from the second light source 43 is incident upon and penetrated through the object 41 being scanned and then enters the light-focusing for image-gathering device 2. In the present preferable embodiment, the imaging device 70 may receive the light reflected by at least one reflection mirror 60 and at least one plane mirror and convert it into electronic signal. The converting device is preferably a charge-coupled device (CCD) or may also be CMOS image-gathering device or any other device that may convert the light image data into electronic signal. When the number of the reflection mirror 60 or the plane mirror 50 is changed or their arranging situation is varied, the actual situation of application is also varied. Since such kind of number variation or the part of arranging situation is belonged to the prior arts and is not the technical characteristic of the invention, so a detailed description is skipped herein.

The reflection mirror 60 has plural concave surfaces 61 that are arranged appropriately. A coating film layer of light-reflecting material is arranged on the surface of the concave surface 61 for providing the function of light reflection, wherein the light-reflecting materials for the coating film layer may be silver, chromium, aluminum, platinum, or other materials of excellent light reflection, all which may be formed on the concave surface 61 by evaporating sputtering, sputtering, chemical deposition, or other film coating processes, etc. The thickness of the coating film layer may be single layer, or may also be multiple layers. All the concave surfaces 61 may focus the light of the image of the object 41 being scanned and may also reflect it into a predetermined route. The raster 80 has plural pervious holes 81, of which positions are just corresponded to each plural concave surface 61 to provide the reflected light coming from each concave surface 61 to pass through a single pervious hole 81.

As shown in FIG. 5B, an embodiment is applied in a scanning device of small size. Since the characteristic of a scanning device of small size is that the size of the object being scanned is almost the same as the size of the mirror for proceeding reflection and direction change and the size of the imaging device 70, so the plural concave surfaces 61 of the reflection mirror are shown as an arrangement of flat plane and the curvature of each plural concave surfaces 61 is same so, after the light of the image of the object 41 being scanned is received and gathered (focused) by the plural concave surfaces 61, it may provide the light of the image of the object being scanned to be reflected in parallel into a predetermined route. As for the application of the plane mirror 50, it is used for reflecting and direction-changing the light into a predetermined route to thereby extend its light-path length, and the plane mirror has no light-focusing function herein. The raster 80 is located in the light-path route between the imaging device 70 and the reflection mirror 60 (or the plane mirror 50). In the present embodiment, each pervious hole 81 of the raster 80 is located in the light-path route near the adjacency of each focusing point for providing a preferable function to filter the unnecessary light. Preferably, the light-focusing for image-gathering device 2 may be further arranged with an image adjusting module 87 for adjusting and correcting the light of the image gathered (focused) by the; concave surfaces 61. The function and the adjusting method for this image adjusting module 87 will describe in detail as the following.

Figure 6A:
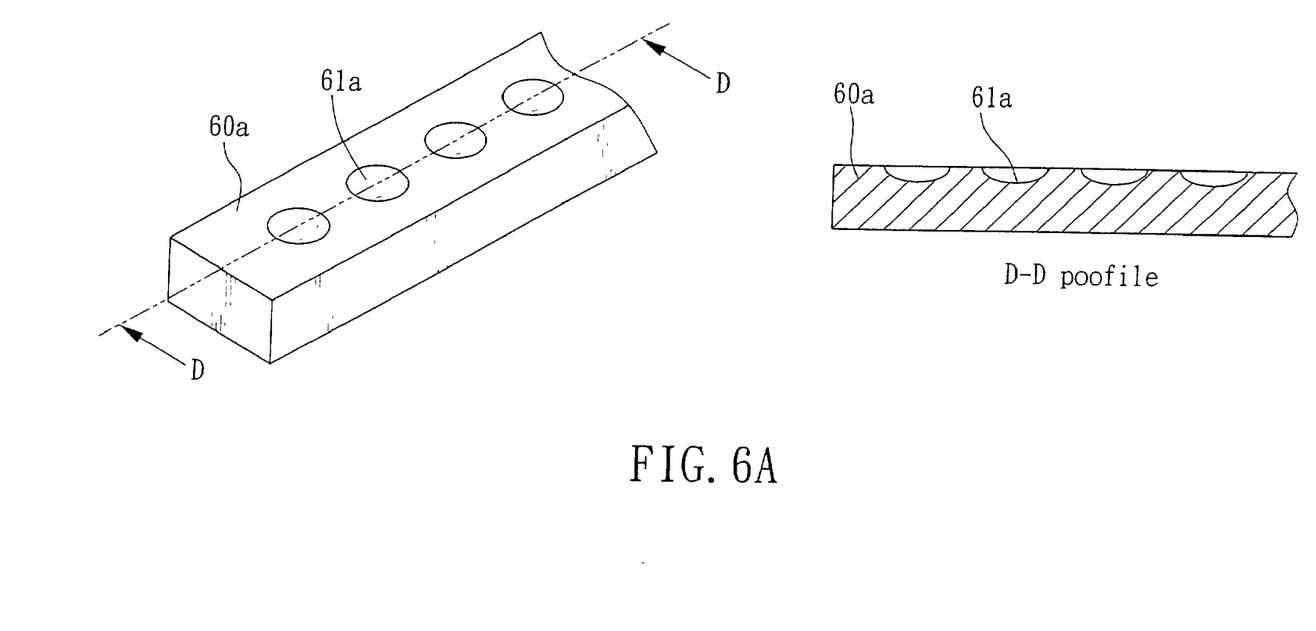
FIG. 6A is a three-dimensional view and a D-D cross-sectional structural illustration for the first preferable embodiment of the reflection mirror according to the invention.
Figure 6B:
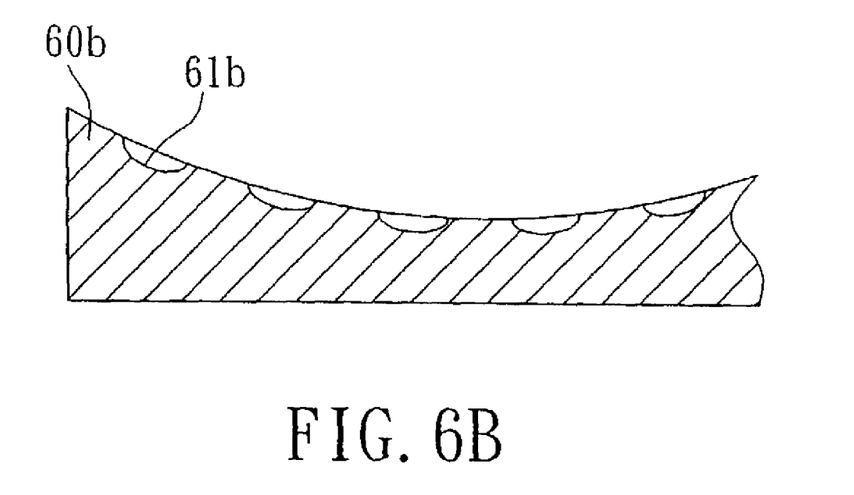
FIG. 6B is a three-dimensional structural illustration for the second preferable embodiment of the reflection mirror according to the invention.
Figure 6C:
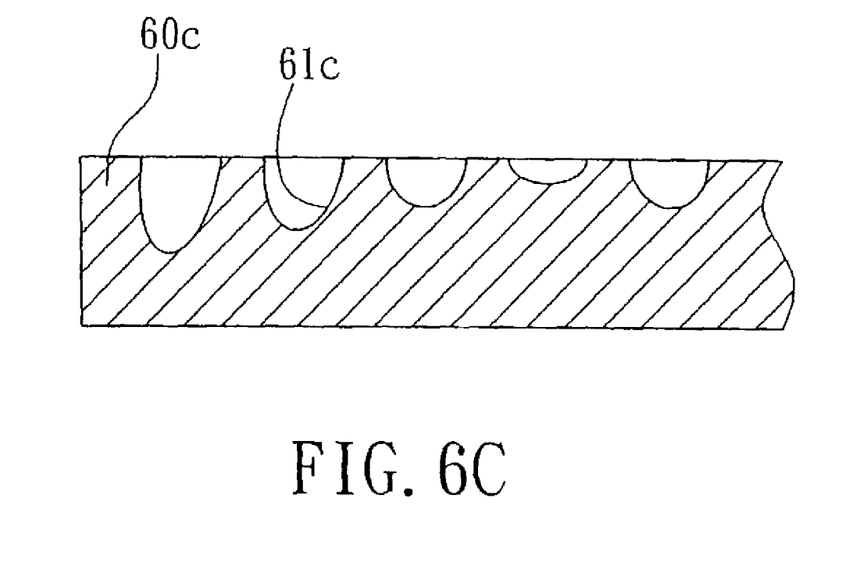
FIG. 6C is a three-dimensional structural illustration for the third preferable embodiment of the reflection mirror according to the invention.

As shown in FIG. 5C, the embodiment is applied in a scanning device of large size. Since the size of the object being scanned of the scanning device of large size is far larger than the size of the mirror for reflection and direction change and the size of the imaging device 70, so the plural concave surfaces 61 of the reflection mirror 60 will have same curvature and are arranged as an arc shape (as shown in FIG. 6B) or the plural concave surfaces 61 will have different curvatures respectively (as shown in FIG. 6C) so, when the light of the image of the object 41 being scanned is received, the plural concave surfaces 61 will focus (gather) the light and directionally change it into a predetermined route by contracting the reflected light toward the central line.

Figure 7A:
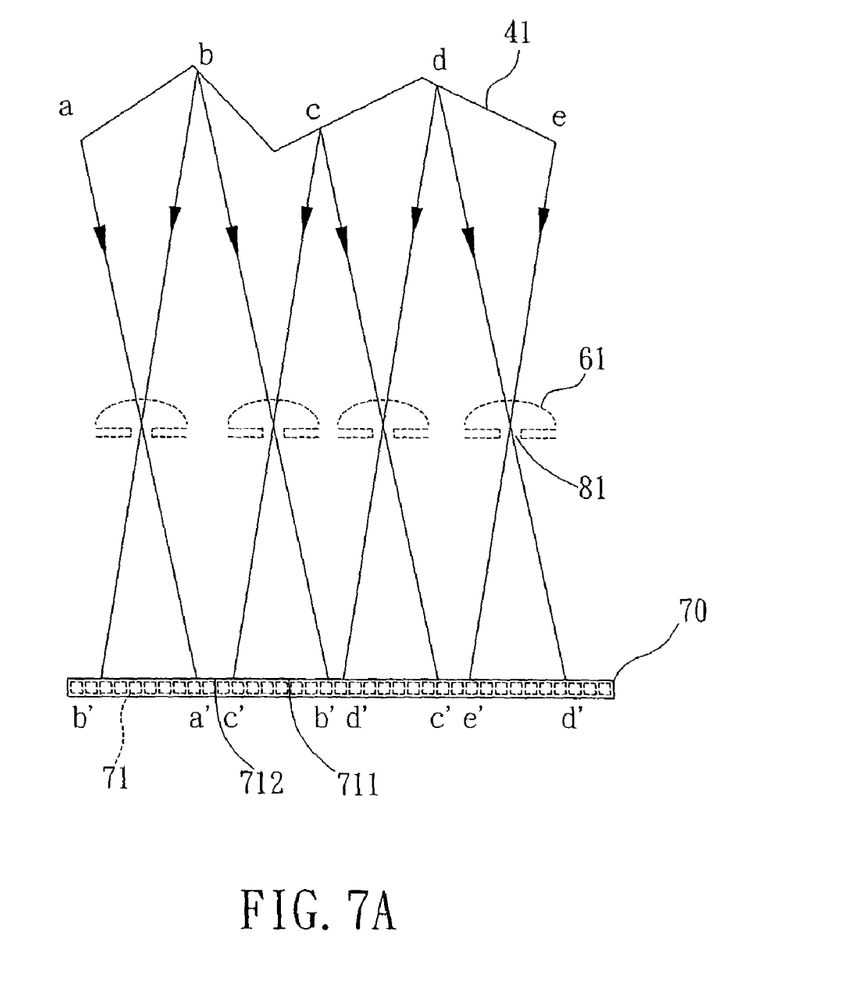
FIG. 7A is an illustration for the invention to execute a graph's image-gathering operation.
Figure 7B:
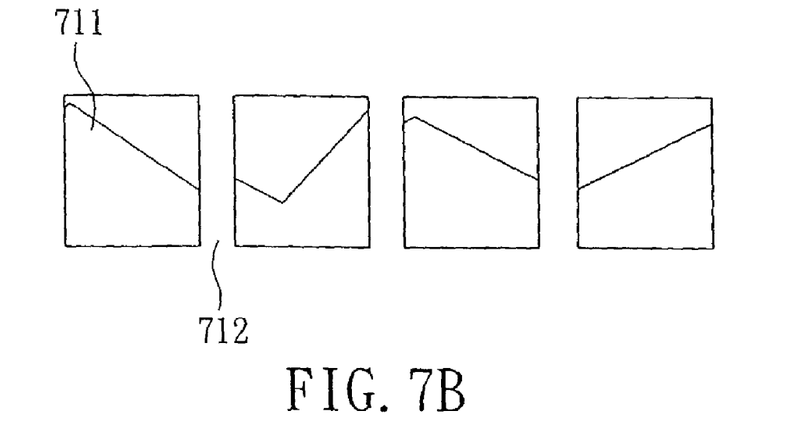
FIG. 7B is an illustration for the invention to execute an image-gathering operation to a graph.
Figure 8:
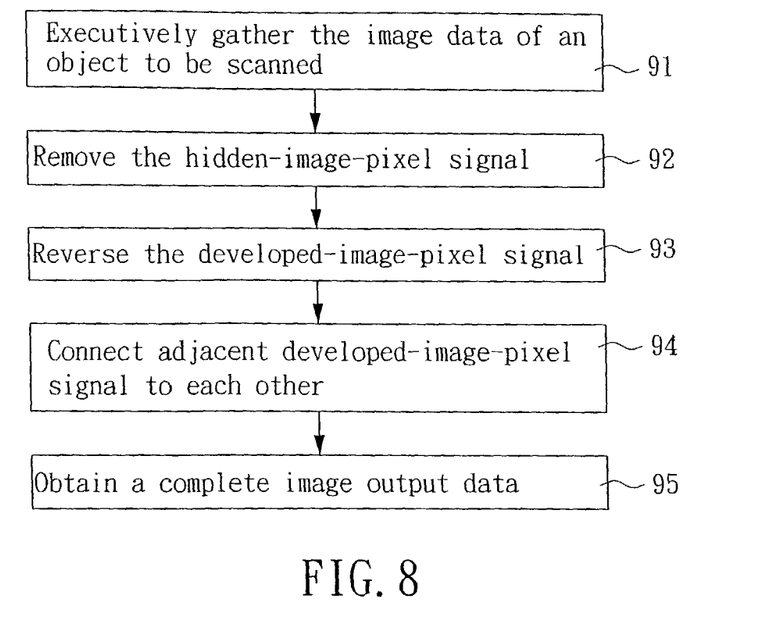
FIG. 8 is a preferable embodiment of a flowchart illustration for the light-focusing for image-gathering treatment method according to the invention.

Please refer to FIG. 7A, which is an illustration for the invention in executing an image-gathering function on a graph. In the scanning method for the light-focusing for image-gathering device 2, after the image of the object 41 being scanned is gathered in section and piece by each concave surface 61, the image is passed through the pervious holes 81 to be provided with a preferable effect of light filtering, and each section and piece of light signal will be projected to the plural pixel units 71 on the imaging device 70, so the light signal of the image of the object 41 being scanned will be partially received and shown as developed-image-pixel signal 711 on the pixel unit 71, but the developed-image-pixel signal 711 will be shown as an image opposite to that of the object 41 being scanned because of the operation of the concave surface 61, besides the connection places of the concave surfaces 61 and the two sides of the concave surface are unable to provide a complete function to focus, refract, and transfer the light signal of the image of the object 41 being scanned, so part of the light signal of the image of the object 41 being scanned will not be received by the pixel unit 71 and will become a hidden-image-pixel signal 712, such that the image of the object 41 being scanned during scanning operation will become an image signal of discontinuity and opposition as shown in FIG. 7B. As shown in FIG. 8, the problem is solved by an imaging-gathering and light-focusing treatment method according to a preferable embodiment proposed by the invention as described as follows.

At 91: Executively gather the image data of an object being scanned, wherein the image data of the object being scanned is divided into two categories: one is the plural developed-image-pixel signals of the receivable light signal of the image of the object being scanned, and the other is the plural hidden-image-pixel signals of the un-receivable light signal of the image of the object being scanned, wherein each hidden-image-pixel signal is located between two developed-image-pixel signals.

At 92: Remove the hidden-image-pixel signals.

Figure 7C:
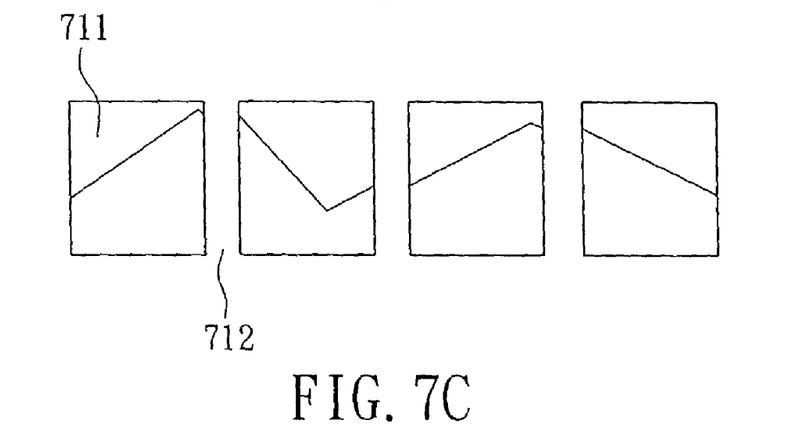
FIG. 7C is an embodiment illustration for the scanned image after the developed-image-pixel signal of the FIG. 7B is converted by the invention.

At 93: Reverse each developed-image-pixel signal, as shown in FIG. 7C.

At 94: Connect adjacent developed-image-pixel signals to each other, and the way of connection may be that adjacent developed-image-pixel are jointed together and, of course, in a preferable embodiment, a software may be applied to process each adjacent developed-image-pixel to be jointed together to become an electronically simulating continuity, such that the connection of each adjacent developed-image-pixel signal will be more smoothly.

Figure 7D:
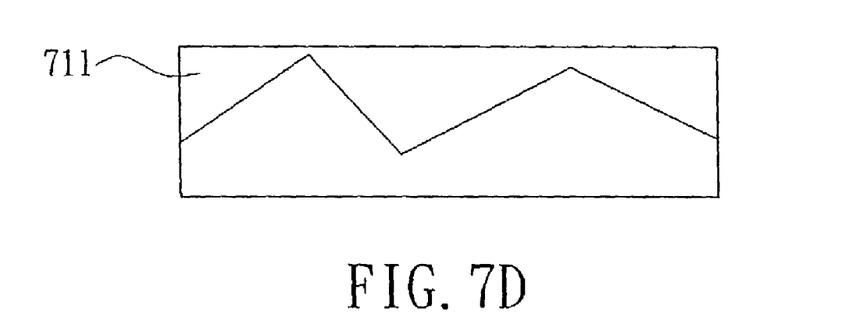
FIG. 7D is an embodiment illustration to be obtained after the invention makes a graph treatment to the scanned image shown in FIG. 7C.

At 95: An image output data may be completely obtained, as shown in FIG. 7D.

Figure 9:
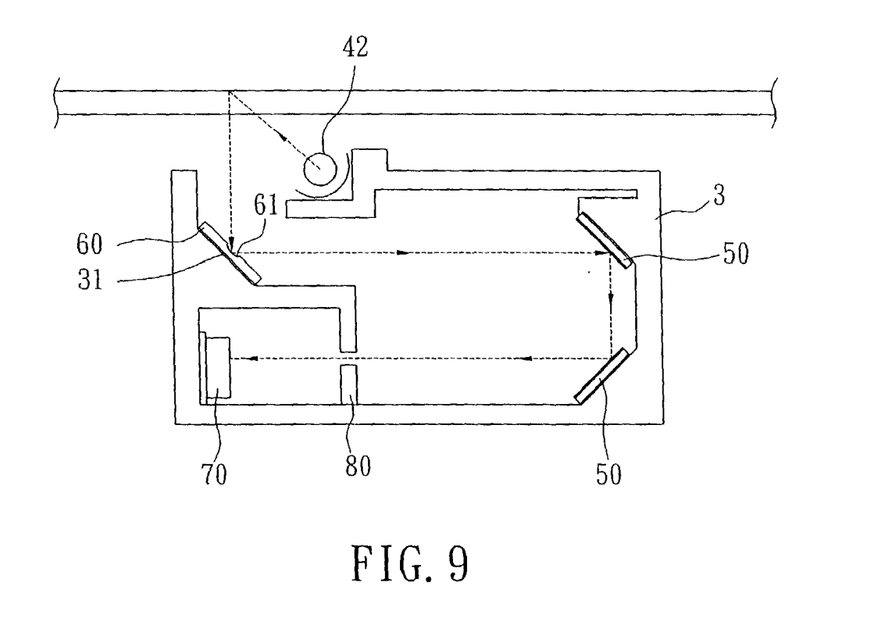
FIG. 9 is a preferable embodiment illustration for the connecting configuration between the light-focusing for image-gathering device and the casing according to the invention.

Please refer to FIG. 9, which is another preferable embodiment for the light-focusing for image-gathering device according to the invention, wherein the light-focusing for image-gathering device 2 is further comprised of a casing 3 that is applied for arranging and positioning the reflection mirror 60, plane mirror 50, light source 42, imaging device 70, and raster 80. Furthermore, several connection surfaces 31 that are corresponded to each other in predetermined angles and positions are formed at the predetermined positions on the wall surfaces inside the casing 3 to provide connecting and positioning functions to the reflection mirror 60 and the plane mirror 50. Since the reflection mirror 60 is easy to be manufactured and be adhered to the connection surface 31 with a plane, so the assembly of the light-focusing for image-gathering device 2 is very convenient, easy, time-saving, and low cost.

What is claimed is:

1. An image-gathering apparatus, comprising:
a reflection mirror having a plurality of concave surfaces configured to gather and directionally change light coming from an object during scanning to a predetermined route;
an imaging device configured to receive the light reflected from the reflection mirror and convert the reflected light into an electronic signal; and
a raster having a plurality of holes configured to correspond with the concave surfaces, wherein the raster is positioned in a light-path between the imaging device and the reflection mirror to filter the light.

2. The image-gathering apparatus according to claim 1, wherein the holes comprise a plurality of narrow long stripes.

3. The image-gathering apparatus according to claim 1, wherein the holes comprise a circular cross-sectional shape.

4. The image-gathering apparatus according to claim 1, wherein the holes comprise a rectangular cross-sectional shape.

5. The image-gathering apparatus according to claim 1, wherein the holes comprise an elliptical cross-sectional shape.

6. The image-gathering apparatus according to claim 1, further comprising a plane mirror located in the light-path and configured to reflect and directionally change the light.

7. The image-gathering apparatus according to claim 1, wherein the reflection mirror further comprises a coating film layer including light-reflecting materials on the concave surfaces.

8. The image-gathering apparatus according to claim 1, further comprising a casing configured to correct and adjust an image of the light gathered by the reflection mirror.

9. The image-gathering apparatus according to claim 1, further comprising a casing configured to accommodate and position the reflection mirror, the imaging device, and the raster.

10. The image-gathering apparatus according to claim 1, wherein the plurality of concave surfaces are positioned within a flat-plane structure.

11. The image-gathering apparatus according to claim 1, wherein the raster further comprises a reflection part positioned on one side surface of the raster in correspondence to an additional reflection mirror configured to reflect the light gathered and directionally changed by the reflection mirror to the imaging device.

12. The image-gathering apparatus according to claim 11, wherein the additional reflection mirror further comprises a coating film layer including light-reflecting materials positioned on the surface of the reflection part.

13. A method, comprising:
gathering light from an object being scanned, wherein the light from the object being scanned is divided into two categories: one of the two categories comprising a plurality of developed-image-pixel signals of a receivable light signal of an image of the object being scanned, and the other of the two categories comprising a plurality of hidden-image-pixel signals of an un-receivable light signal of the image of the object being scanned, wherein the hidden-image-pixel signals are located between corresponding pairs of adjacent developed-image-pixel signals;
removing the hidden-image-pixel signals;
reversing the developed-image-pixel signals after removing the hidden-image-pixel signals; and
connecting the adjacent developed-image-pixel signals to form image output data.

14. The method according to claim 13, wherein the light from the object being scanned comprises a continuous image data obtained in a scanning procedure executed on the object being scanned by an optical scanner.

15. The method according to claim 13, further comprising applying an electronic simulating continuity to connect each of the adjacent developed-image-pixel signals after said connecting of the adjacent developed-image-pixel signals to form the image output data.

16. The method according to claim 15, wherein the electronic simulating continuity is processed by a software.

17. An apparatus, comprising:
means for gathering and for dividing light received from an object during scanning into a plurality of developed image pixels and a plurality of hidden image pixels, wherein a portion of the plurality of hidden image pixels is positioned between two portions of the plurality of developed image pixels;
means for removing the portion of the plurality of hidden image pixels; and
means for connecting the two portions of the plurality of developed image pixels to one another after removing the portion of the plurality of hidden image pixels.

18. The apparatus according to claim 17, further comprising:
means for converting the plurality of developed image pixels into an electronic signal.

19. The apparatus according to claim 18, further comprising:
means for reversing the two portions of the plurality of developed image pixels.

20. The apparatus according to claim 18, wherein the two portions of the plurality of developed image pixels are connected to one another as an electronic simulating continuity.

21. An apparatus, comprising:
a mirror having a plurality of concave surfaces that are configured to reflect light received from an image;
an imaging device configured to receive the light reflected from the plurality of concave surfaces; and
a light filter having a plurality of holes, wherein the light filter is positioned between the imaging device and the mirror to allow the light to pass through the plurality of holes.

22. The apparatus according to claim 21, wherein the plurality of concave surfaces comprise a total number of concave surfaces, wherein the plurality of holes comprise a total number of holes, and wherein the total number of concave surfaces equals the total number of holes.

23. The apparatus according to claim 22, wherein the light reflected from each of the plurality of concave surfaces passes through a single hole.

24. The apparatus according to claim 22, wherein the light reflected from each of the plurality of concave surfaces passes through a different hole.

25. The apparatus according to claim 21, wherein the light that passes through the plurality of holes comprises parallel light paths.

26. The apparatus according to claim 25, wherein the plurality of concave surfaces have generally the same curvature.

27. The apparatus according to claim 21, wherein the light that passes through the plurality of holes comprises non-parallel light paths.

28. The apparatus according to claim 27, wherein the non-parallel light paths converge onto the imaging device.

29. The apparatus according to claim 27, wherein at least two of the plurality of concave surfaces have different curvature.

30. The apparatus according to claim 27, wherein the plurality of concave surfaces are arranged within an arc structure.

31. The apparatus according to claim 21, wherein an angle of reflection of the light from the plurality of concave surfaces is determined according to a size of the image.

32. The apparatus according to claim 21, wherein the light is reflected by the plurality of concave surfaces at varying angles through the plurality of holes.

* * * * *

UNITED STATES PATENT AND TRADEMARK OFFICE
CERTIFICATE OF CORRECTION

| | | |
|---|---|---|
| PATENT NO. | : 7,859,727 B2 | Page 1 of 1 |
| APPLICATION NO. | : 10/256425 | |
| DATED | : December 28, 2010 | |
| INVENTOR(S) | : Fang | |

It is certified that error appears in the above-identified patent and that said Letters Patent is hereby corrected as shown below:

Title page, item (57), under "Abstract", in Column 2, Line 21, before "scanned" delete "be".

Column 8, line 29, in Claim 7, delete "materials" and insert -- materials arranged --.

Signed and Sealed this
Twentieth Day of September, 2011

David J. Kappos
*Director of the United States Patent and Trademark Office*